United States Patent
Cohen et al.

(10) Patent No.: US 11,231,481 B1
(45) Date of Patent: Jan. 25, 2022

(54) RADAR FALSE NEGATIVE ANALYSIS

(71) Applicant: Zoox, Inc., Foster City, CA (US)

(72) Inventors: Joshua Kriser Cohen, Sunnyvale, CA (US); Anton Mario Bongio Karrman, Foster City, CA (US); Dilip Bethanabhotla, Freemont, CA (US); Subasingha Shaminda Subasingha, Weston, FL (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 219 days.

(21) Appl. No.: 16/407,139

(22) Filed: May 8, 2019

(51) Int. Cl.
*G01S 7/292* (2006.01)
*G01S 7/41* (2006.01)
*G01S 13/931* (2020.01)

(52) U.S. Cl.
CPC ............. *G01S 7/2927* (2013.01); *G01S 7/411* (2013.01); *G01S 13/931* (2013.01)

(58) Field of Classification Search
CPC ....... G01S 7/2927; G01S 7/411; G01S 13/931
USPC .......................................................... 342/90
See application file for complete search history.

(56) References Cited

U.S. PATENT DOCUMENTS

| | | | | |
|---|---|---|---|---|
| 7,124,027 | B1 * | 10/2006 | Ernst, Jr. | G01S 13/931 |
| | | | | 701/301 |
| 8,989,944 | B1 * | 3/2015 | Agarwal | G01S 13/589 |
| | | | | 701/23 |
| 2003/0030583 | A1 * | 2/2003 | Finn | G01S 13/0209 |
| | | | | 342/70 |
| 2005/0073411 | A1 * | 4/2005 | Butler | G01S 13/87 |
| | | | | 340/552 |
| 2013/0265189 | A1 * | 10/2013 | Chang | G01S 13/87 |
| | | | | 342/52 |
| 2017/0293025 | A1 * | 10/2017 | Davis | G01S 7/0234 |

FOREIGN PATENT DOCUMENTS

WO          WO2020259916          * 12/2020

* cited by examiner

*Primary Examiner* — Timothy A Brainard
(74) *Attorney, Agent, or Firm* — Lee & Hayes, P.C.

(57) ABSTRACT

Techniques are described for determining a likelihood that a radar device failed to detect an object (i.e., a false negative). Determining the likelihood may be based at least in part on determining an estimated noise floor based at least in part on at least a portion of radar data, which may comprise one or more detections, and determining a likelihood that the portion of radar data includes a false positive, based at least in part on the estimated noise floor and a response profile associated with an object. A response profile may identify a received signal power and/or radar cross section associated with an object type.

21 Claims, 7 Drawing Sheets

RADAR FALSE NEGATIVE ANALYSIS

BACKGROUND

Radar generally measures the distance from a radar device to the surface of an object by transmitting a radio wave and receiving a reflection of the radio wave from the surface of the object, which may be read by a sensor of the radar device. The sensor may generate a signal based at least in part on radio waves incident on the sensor. This signal may include a return signal attributable to the reflection, but the signal may also include portions attributable to noise and/or other interfering signals (whether from the radar device itself or from an external source). To distinguish a return signal from noise or other interfering signals, radar devices generally use a detection threshold for suppressing false positive detections (i.e., identifying a portion of the signal as being a return when, in fact, the portion of the signal is attributable to noise and/or other interfering signals). In some situations, however, this may be problematic (and dangerous) as such suppressions may be associated with real returns.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

False positive suppression techniques for radar may comprise determining a detection threshold to reduce a number of false positives and/or to keep the number of false positives below a specified false positive rate (i.e., a "false alarm rate" in radar vernacular, false detections per unit time). For example, constant false alarm rate techniques (CFAR), such as cell-averaging CFAR (CA-CFAR), tests each cell (i.e., portion) of radar data to see if a signal associated with a cell of interest meets or exceeds a detection threshold determined by averaging the signal of the cell of interest and/or signals associated with cells around the cell of interest. This presumes that, if the cell of interest includes a return signal, the cells around the cell of interest are likely to provide a good estimate of the noise in that scanned region. Other techniques may be used alternately or additionally to a CFAR technique, such as selecting a maximal portion of a signal associated with a cell as a return signal.

However, false positive suppression techniques tend to increase the number of false negatives, i.e., portions of a signal generated by the sensor that are attributable to a reflection from an object, yet are suppressed. For autonomous vehicles, a false negative—a failure to identify an object that exists in an environment surrounding the autonomous vehicle—presents a great risk to operating the autonomous vehicle safely and efficiently.

The techniques discussed herein may comprise determining a likelihood that a portion of radar data may comprise a false negative. For example, the portion of radar data may be associated with a portion of an environment scanned by a radar device (e.g., a portion of the environment corresponding to a distance and/or azimuth bin of the radar data). The techniques may describe determining such a likelihood for one or more portions of the environment in association with an occupancy grid (e.g., a map of the environment indicating a likelihood that respective portions of the environment are occupied by an object and/or portions that are free space into which an autonomous vehicle may move). In at least some examples, multiple determinations may be made for varying object types in such grids (e.g., a false negative likelihood map for bicyclists may differ from pedestrians). In some examples, an autonomous vehicle may generate a trajectory for controlling operation of the autonomous vehicle based at least in part on one or more likelihoods determined according to the techniques discussed herein.

In some examples, determining the likelihood that a portion of radar data may comprise a false negative may include calculating a Bayesian likelihood (and/or any other suitable likelihood function) based at least in part on a probability that a portion of radar data comprises a false negative (e.g., the probability may be at least part of the "parameter" for the likelihood determination), an estimated noise floor, and/or a response profile associated with an object type (e.g., the estimated noise floor and the response profile may be random variables associated with the likelihood determination). In other words, the likelihood may be an indication of how likely it is that an object was not detected in a certain region, based on a calculated estimation of what the noise floor was for that region and based on how an object of a certain type tends to reflect radio waves.

In some examples, the techniques may comprise determining an estimated noise floor, since radar devices don't always make available the raw signals generated by the sensors thereof. In other words, the magnitude of received power and/or RCS for a scanned region may not be available for analysis to identify false negatives therefrom. Instead, radar devices may output object detections determined by the radar device. In some examples, the object detections output by a radar device may comprise data related to a return signal associated with the object detection, such as a distance (e.g., distance from the radar device to the detected object), received power associated (e.g., magnitude of the return signal associated with the object detection), azimuth (e.g., yaw angle associated with the return signal and the object detection's location in the environment relative to the radar device), elevation (e.g., altitude angle associated with the return signal and the object detection's location in the environment relative to the radar device), and/or doppler (e.g., velocity of the detected object relative to the radar device). In some examples, the radar data may additionally or alternatively comprise a signal-to-noise ratio (SNR) and/or a radar cross section (RCS) associated with the object detection. However, the radar device may not necessarily output data related to portions of the signal that aren't associated with the object detection, e.g., portions of a radar sensor signal that were less than a threshold set by the radar device.

Note that, as used herein, a "return signal" is a portion of a signal generated by a sensor responsive to a reflection of radio waves from an object to the sensor. A radar device may identify a portion of the signal as being a return signal by determining a detection threshold (i.e., a noise threshold; e.g., determined by a CFAR algorithm) and determining that the return signal is a portion of the signal that meets or exceeds the detection threshold. An "object detection," as relates to radar data, may comprise an indication generated by a radar device that an object has been detected, based at least in part on identifying a return signal. An object detection may be a true positive when the object detection is associated with an object. The return signal associated with a true positive detection is referred to herein as a true positive return signal. A failure of the radar device to identify a portion of the signal as being associated with an object and therefore failing to generate an object detection for the object may be a false negative. Such a return signal and object detection are referred to herein, respectively, as a false negative return signal and a false negative object detection.

The techniques discussed herein may determine the estimated noise floor based at least in part on fitting a constant, a Gaussian distribution, mixture models, Fourier series, and/or polynomial function to one or more detections indicated by the radar data (e.g., fitting a Gaussian distribution to a received power associated with one or more detections). The estimated noise floor may comprise an estimate of a detection threshold (e.g., a detection threshold set by a CFAR algorithm). In some examples, determining a constant estimated noise floor comprises determining a detection associated with a lowest received power (e.g., within a bin or other similar portioning of radar data, such as an azimuth, distance, and/or doppler bin) and setting the constant estimated noise floor to be a value less than the lowest received power that is proximate to the lowest received power (e.g., some percentage thereof). Similarly, fitting a Gaussian distribution, mixture model, Fourier series, and/or polynomial function to the one or more detections may comprise ensuring that no detection is associated with a received power that is less than the Gaussian distribution, mixture model, Fourier series, and/or polynomial function. In some examples, determining the estimated noise floor may be based at least in part on a noise factor, which may be determined based at least in part on a received power, SNR, and/or the like.

In some examples, the techniques may additionally or alternatively comprise choosing an estimated noise floor based at least in part on an object detection received from an additional or alternate sensor modality (e.g., a camera, LIDAR). For example, the techniques may additionally or alternatively comprise selecting a noise floor based at least in part on a size of an object, an object classification, etc.

Determining the likelihood that a portion of radar data may additionally or alternatively comprise receiving and/or determining a response profile associated with an object type. A response profile may parameterize characteristic(s) of an object type that affect a manner in which the object type reflects radio waves and, therefore, how the object type "shows up" in a radar sensor output signal. For example, the response profile may comprise a a received power and/or RCS associated with the object type. In some examples, values of the received power and/or RCS indicated by the response profile may be deterministic or, in additional or alternate examples, the values may be probabilistic, e.g., as indicated by probability distribution function associated. In some instances, a likelihood that an object was failed to be detected may be determined for one or more object types. For example, the techniques may comprise determining a first likelihood that a pedestrian wasn't detected, a second likelihood that a large vehicle wasn't detected, a third likelihood that a small vehicle wasn't detected, a fourth likelihood that a traffic sign wasn't detected, and/or so on. In some examples, the techniques may comprise storing a response profile in association with an object type, object size, object reflectivity, and/or the like. In some examples, the response profile may be indexed by distance, azimuth, and/or doppler.

The techniques may additionally or alternatively comprise determining a likelihood associated with an object type and a portion of the environment (e.g., for different bins of distances, azimuths, doppler, and/or elevations). The techniques may comprise associating a likelihood with a portion of a radar spatial grid. For example, a radar spatial grid may comprise a plurality of cells, each of which may represent different portions of the environment and/or different bins of radar data. In some examples, a cell may have one or more likelihoods associated therewith, wherein each likelihood may be associated with a different object type.

In some examples, an autonomous vehicle may generate a trajectory for controlling operation of the autonomous vehicle based at least in part on the radar spatial grid. The techniques may thereby improve the safety and efficacy of operation of the autonomous vehicle. Moreover, the techniques discussed herein may enable a computer to infer the existence of a false negative in radar data without needing to receive the raw radar signal and/or without (proprietary) information regarding the algorithm by which the radar device generates detections.

Example Scenario

Figure 1:
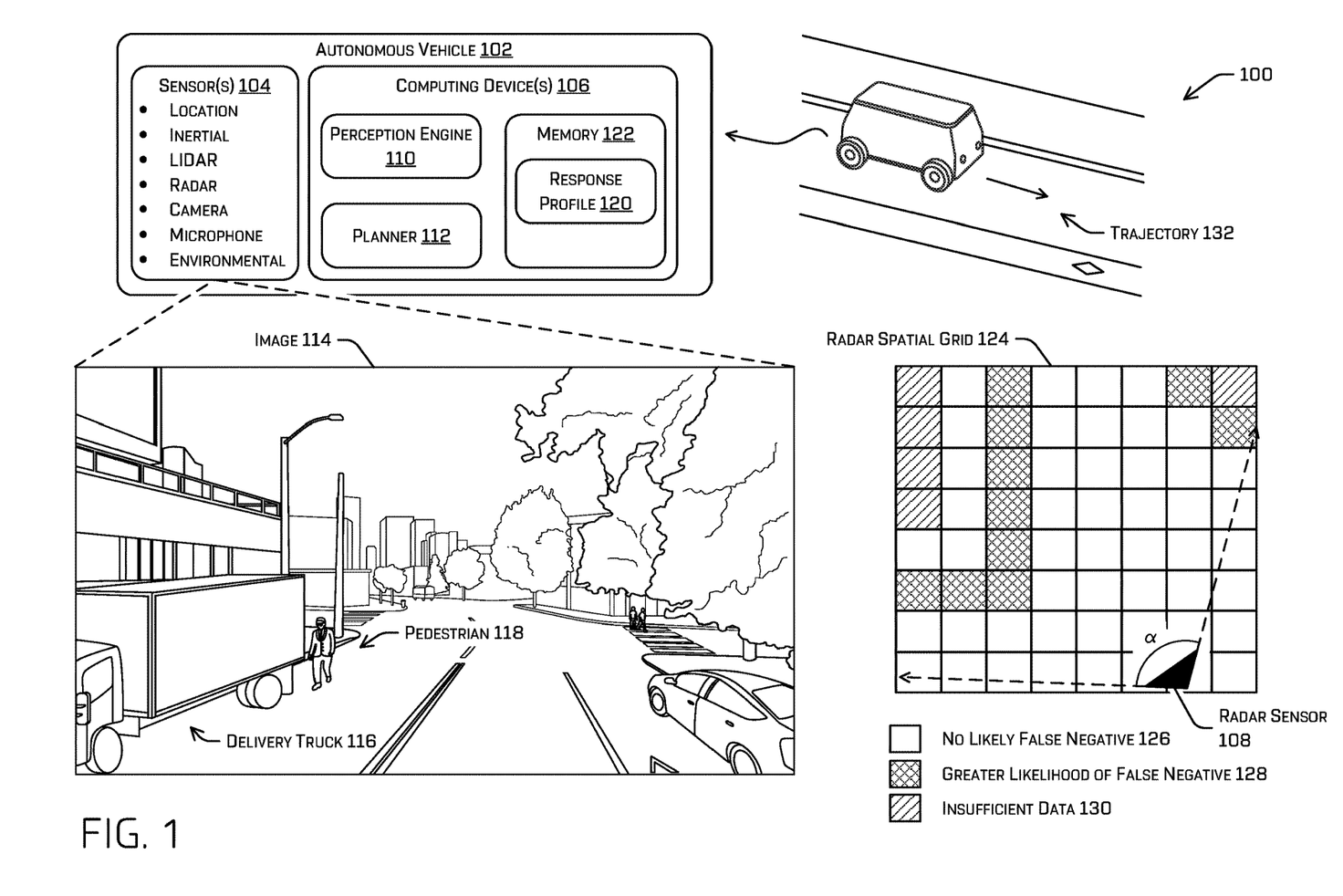
FIG. 1 illustrates an example scenario where a radar device of an autonomous vehicle may generate a false negative.

FIG. 1 illustrates an example scenario 100 including an autonomous vehicle 102 that may determine a likelihood that at least a portion of radar data includes a false negative. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to airspace object detection, manufacturing, augmented reality, etc. Moreover, even though the autonomous vehicle 102 is depicted as a land vehicle, autonomous vehicle 102 may be a spacecraft, watercraft, and/or the like.

According to the techniques discussed herein, the autonomous vehicle 102 may receive sensor data from sensor(s) 104 of the autonomous vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the autonomous vehicle 102 and data capture, processing, commands, and/or controls may be communicated to/from the autonomous vehicle 102 by one or more remote computing devices via wired and/or wireless networks.

FIG. 1 depicts an example of a radar sensor 108, which may be associated with autonomous vehicle 102 and/or may collect radar sensor data as the autonomous vehicle 102 traverses the environment. In some examples, the radar sensor 108 may have a field of view, α, covering at least a portion of the environment surrounding the autonomous vehicle 102, i.e., a scanned region. In various examples, the autonomous vehicle 102 may have any number of one or more radar sensors (1, 2, 4, 5, 8, 10, etc.). In the illustrated example, the field of view, α, is depicted as being about a 110-degree view. However, in other examples, the field of view of the radar sensors can be greater than (e.g., 120 degrees, 180 degrees, 220 degrees, 270 degrees, 360 degrees) or less than (e.g., 90 degrees, 60 degrees, 45 degrees) this angle. Moreover, the autonomous vehicle 102 may include multiple radar sensors having multiple different fields of view, distances, scan rates, and the like. In some examples, the autonomous vehicle 102 may include multiple radar sensors with at least partially overlapping fields of view such that multiple radar sensors capture at least portion of the environment in common.

In some examples, the computing device(s) 106 may comprise a perception engine 110 and/or a planner 112. In general, the perception engine 110 may determine what is in the environment surrounding the autonomous vehicle 102 and the planner 112 may determine how to operate the autonomous vehicle 102 according to information received from the perception engine 110 regarding the environment. The perception engine 110 may include one or more machine-learned (ML) models and/or other computer-executable instructions for detecting, identifying, segmenting, classifying, and/or tracking objects from sensor data collected from the environment of the autonomous vehicle 102.

Figure 2:
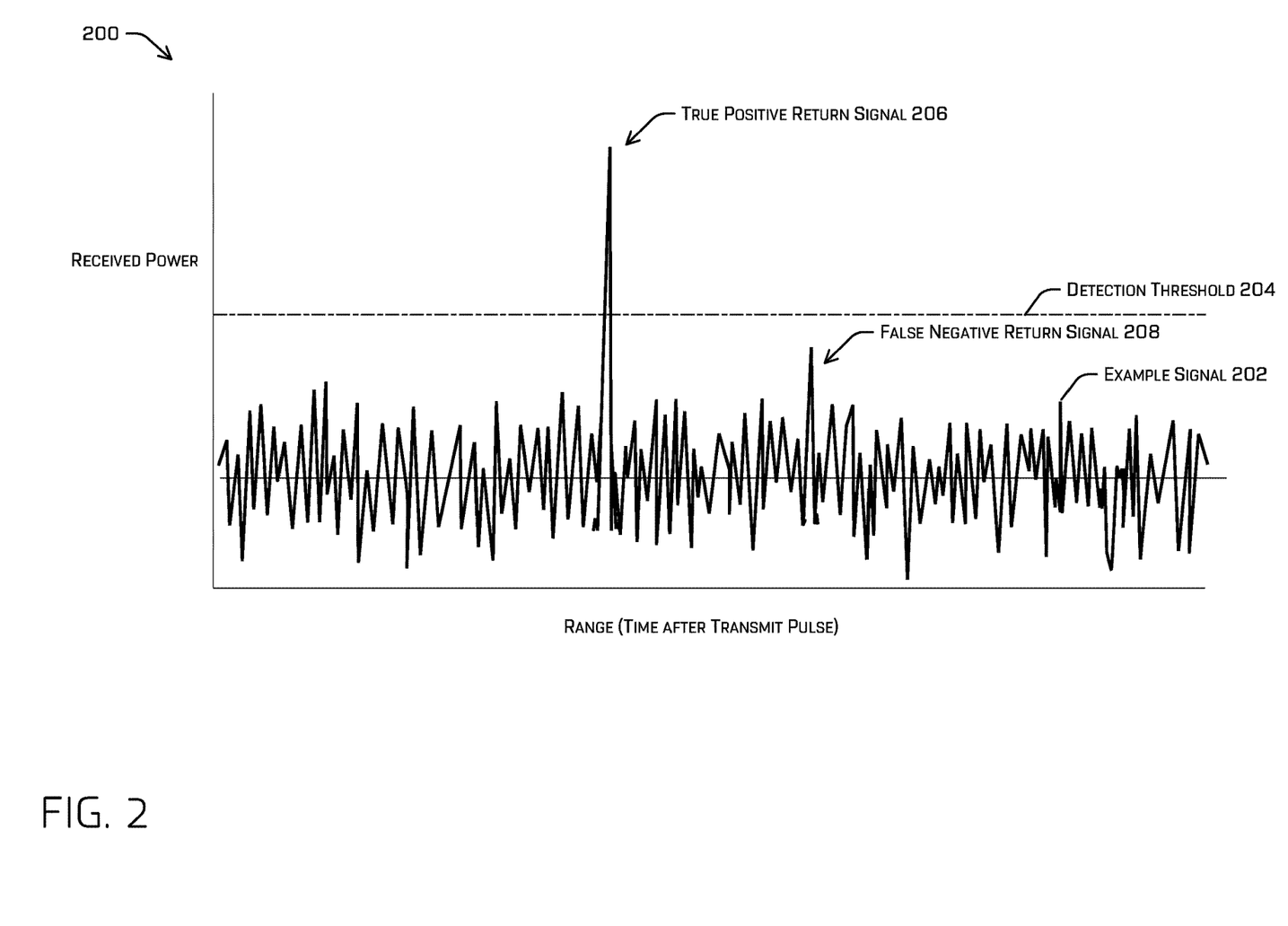
FIG. 2 illustrates a graph of an example signal generated by a sensor of a radar device, an example noise floor, a true positive return signal, and a false negative return signal.

In some examples, computing device(s) 106 may receive radar data from one or more radar devices. FIG. 2 depicts a graph 200 of an example signal 202 that may be generated by a sensor of a radar device responsive to radio waves incident on the sensor. In some examples, the radar device may receive example signal 202 and determine a detection threshold 204 based at least in part on properties of the example signal 202 (e.g., average magnitude, average power), which may depend on a hardware and/or software configuration of the radar device (e.g., depending on the kind of CFAR algorithm used by the radar device). Note that detection threshold 204 is depicted as a constant noise floor, although additional or alternate noise floor types are contemplated, as discussed further herein. The radar device may output an object detection associated with a portion of the example signal 202 that meets or exceeds the detection threshold 204,—this portion is referred to herein as a "return signal." Example signal 202 includes one such portion (i.e., true positive return signal 206), and, if this return signal is attributable to radio waves reflected from an object, this return signal is a true positive return signal 206. As discussed further herein, if another portion of the example signal 202 is also associated with an object, yet no object detection is generated by the radar device because that portion of the signal does not meet the detection threshold 204, then that portion is a false negative return signal 208.

Figure 4:
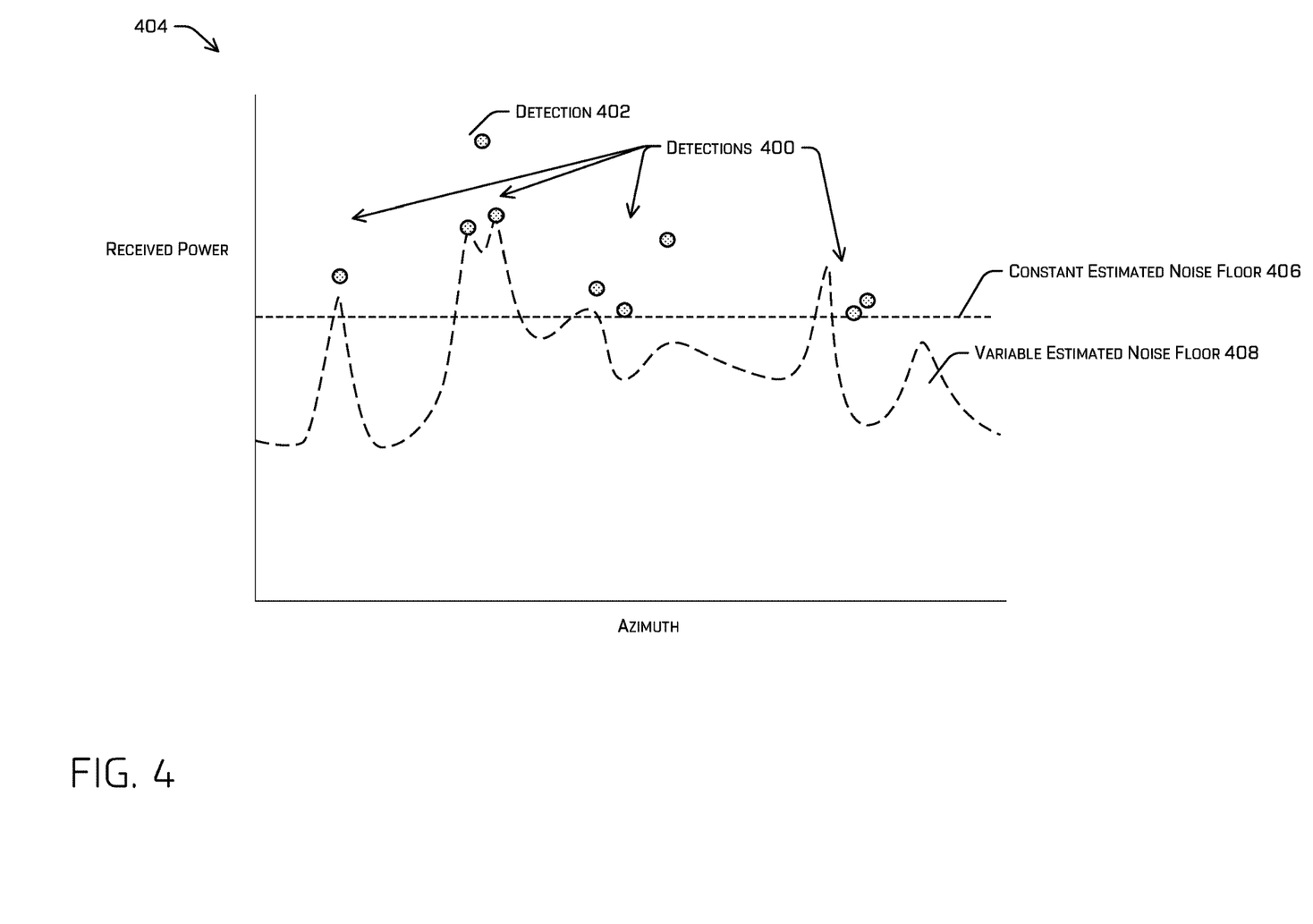
FIG. 4 illustrates detections received from a radar device, two estimated noise floors, and an average signal power.

However, instead of outputting the example signal 202 in addition or alternatively to outputting an object detection, in some examples, a radar device may output an object detection that indicates a distance, azimuth (e.g., scanning angle at which the object was detected), doppler, elevation, received power (e.g., magnitude and/or power of the return signal), SNR, and/or RCS associated with the detected object. For example, FIG. 4 depicts an example of a plurality of object detections 400 and an example object detection 402. In other words, the perception engine 110 may receive radar data that may include object detection(s) and may or may not include data about the original signal from which the object detection(s) were derived and/or the raw signal itself.

Note that the graphs and grids depicted herein are depicted as two-dimensional graphs and grids, although the data represented thereby may be two or more dimensional. For example, radar data and/or object detections may comprise one or more dimensions such as, for example, a received power, distance, azimuth (e.g., scanning angle at which the object was detected), doppler, elevation, received power (e.g., magnitude and/or power of the return signal), SNR, and/or RCS. In other words, graph 200 may comprise a received power indicated by a radar sensor over time at a particular azimuth and/or elevation and graph 404 may comprise a received power indicated by various object detections over various azimuths and at a particular elevation and/or distance.

In some examples, computing device(s) 106 may additionally or alternatively receive an image 114 from the sensor(s) 104. Image 114 depicts an example scenario in which it may be more likely that a radar device may be more likely to miss detecting a return signal, such as false negative return signal 208, thereby generating a false negative. Generally, the magnitude of the power of a return signal may depend on a size, material, orientation, and/or surface angles of the object which reflected the radio waves that cause the return signal. Therefore, large objects, such as the delivery truck 116 depicted in image 114 tend to create a larger return signal than smaller objects, such as pedestrian 118, in a radar signal. For example, the true positive return signal 206 may be attributable to a rear portion of the delivery truck 116 and the false negative return signal 208 may be attributable to the pedestrian 118. In some examples, such large return signals, such as the return signal caused by the delivery truck 116, may skew a detection threshold 204 determined by the radar device to be higher because of the greater magnitude of the return signal attributable to the larger object. Smaller objects within a same or similar region may go undetected by the radar device because of the skewed noise threshold 204. The proximity at which an undetected object must be to a "skewing" object to go undetected may depend on the technique by which the detection threshold 204 is set by the radar device (e.g., if the detection threshold is based on a region of cells, smaller objects within that region may go undetected, whereas if the detection threshold is determined cell by cell there may be a slightly better probability that a smaller object will be detected).

In some examples, the perception engine 110 may determine a likelihood that an object detection is a true positive, false positive, true negative, or false negative. For example, the perception engine 110 may comprise a component for determining a likelihood that a portion of radar data received from a radar device comprises a false negative. In some examples, to determine the likelihood the perception engine 110 may comprise a component for determining an estimated noise floor, receiving a response profile 120 associated with an object type (e.g., retrieving the response profile 120 from a memory 122 associated with the computing device(s) 106), and determining the likelihood based at least in part on the estimated noise floor and the response profile 120. For example, the perception engine 110 may determine an estimated noise floor based at least in part on one or more object detections received from a radar device. Memory 122 may store one or more response profiles 120 associated, respectively, with different object types and/or different object parameters (e.g., size, estimated reflectivity).

The perception engine 110 may determine a likelihood that a portion of radar data comprises a false negative based at least in part on an estimated noise floor and a response profile 120 associated with an object type. In other words, the perception engine 110 is determining whether it's likely that the radar device failed to detect an object of the object type in a particular region of the environment associated with the portion of radar data. In some examples, the portion of radar data may be defined to be a bin or some other portion thereof representing a portion of the environment. A bin may comprise radar data associated with a set of distances, azimuths, elevations, and/or received powers. For example, a particular bin may include the received power data associated with any object detections associated with a range of azimuths, distances, and/or elevations specified by the bin. In some instances, a bin may be associated with and/or represented as a cell in a radar spatial grid 124, as discussed in more detail below. In some examples, a bin may be associated with a set constant and/or range of values in one or more dimensions of the radar data. For example, a bin may be associated with a constant elevation, a range of distances, a range of azimuths, and/or any doppler value.

The perception engine 110 may additionally or alternatively utilize sensor data captured by sensor(s) 104 to generate and maintain one or more spatial grids, including a radar spatial grid 124, that may include cells associated with regions of the environment. Each cell of the radar spatial grid 124 may be associated with a bin (or other portion) of radar data. In some examples, the perception engine 110 may determine a likelihood that radar data associated with a cell includes a false negative and may indicate whether the likelihood meets or exceeds a threshold likelihood in association with the cell. The perception engine 110 may determine multiple likelihoods for different object types for a single cell.

For example, the radar spatial grid 124 depicted in FIG. 1 may have likelihoods associated with a first object type (e.g., "pedestrian," "large vehicle," "passenger vehicle," "cyclist," "four-legged animal") associated therewith. The radar spatial grid 124 may additionally or alternatively comprise likelihoods associated with one second or more object types. The radar spatial grid 124 depicted in FIG. 1 comprises indications that a respective cell of the radar spatial grid 124 (indication 126) is associated with a likelihood that does not meet or exceed a likelihood threshold, (indication 128) is associated with a likelihood that meets or exceeds a likelihood threshold, or (indication 130) is not associated with adequate radar data (e.g., due to an occlusion). It is understood that the radar spatial grid 124 may be associated with binary indications like those described above (i.e., likely/not likely), however, in some examples, the likelihood calculated for an object type and for radar data corresponding to a cell may be associated itself with the cell radar spatial grid 124. In other words, a particular cell may have associated therewith a likelihood value for each object type for which a likelihood was calculated (instead of or in addition to an indication like the indication depicted in FIG. 1).

In some instances, a cell of the radar spatial grid 124 may alternatively or additionally comprise a designation of being occupied by an object (e.g., at least one object detection was output by the radar device or another system of the autonomous vehicle 102 in association with a region of the environment corresponding to the cell), and/or additional metadata related to such a detection, e.g., other data determined by perception engine 110 as discussed in more detail herein such as, for example, a semantic label, lidar points, lidar instance segmentation, radar instance segmentation, and/or the like.

The radar spatial grid 124 is shown as an 8×8 grid for simplicity in this example. However, in other examples, any size (e.g., area in the real world associated with the spatial grid), shape (e.g., length and width of the spatial grid), and resolution (e.g., size of cells used to make up the spatial grid) may be used for the radar spatial grid 124 depending on the accuracy and precision needed, bin dimensions, memory size constraints, processing speed and load constraints, sensor range limitations, and/or the like. In some examples, a spatial grid may be sized and shaped to match a reliable range of the sensor(s) 104 that are used to capture sensor data from which the spatial grid is populated, and the resolution may be chosen by maximizing accuracy and precision needed for a given application given memory and processing constraints. In some examples, the length and the width may be the same, while in other examples the length and width may be different. In one specific example, the size of the spatial grid may be approximately 50-200 meters wide by approximately 50-200 meters long, with a resolution of 0.25 meters per cell.

In some instances, the perception engine 110 may additionally or alternatively determine a position of the autonomous vehicle 102 determined by a localization engine (not pictured, which may use any sensor data to localize the autonomous vehicle 102), data related to objects in the vicinity of the autonomous vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 110 (including the radar spatial grid 124 and/or any of the false negative likelihoods discussed herein) may be collectively referred to as "perception data." Once the perception engine 110 has generated perception data, the perception engine 110 may provide the perception data to the planner 112.

The planner 112 may use the perception data, including the radar spatial grid 124 and/or any of the false negative likelihoods discussed herein, to localize a position of the autonomous vehicle 102 on a global map and/or a local map (which may additionally or alternatively be accomplished by an unillustrated localization component), determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). For example, the planner 112 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on the radar spatial grid 124 and/or likelihood to control the vehicle to traverse the route (e.g., in order to avoid any of the detected objects, as well as incorporate likelihood(s) of where an object may not have been detected by a radar device); and select one of the potential trajectories as a trajectory 132 of the autonomous vehicle 102 that may be used to generate a drive control signal that may be transmitted to drive components of the autonomous vehicle 102. FIG. 1 depicts an example of such a trajectory 132, represented as an arrow indicating a heading, velocity, and/or acceleration, although the trajectory itself may comprise instructions for a PID controller, which may, in turn, actuate a drive system of the autonomous vehicle 102.

Example Signal Diagram

FIG. 2 depicts a graph 200 of an example signal 202 that may be generated by a sensor of a radar device responsive to radio waves incident on the sensor. As discussed in more detail above, a radar device may determine a detection threshold 204 based at least in part on properties of the example signal 202 and a configuration of the hardware and/or software configuration of the radar device. The depicted example illustrates a scenario where the detection threshold 204 set by the radar device caused a true positive return signal 206 to be identified, but another return signal was not detected, false negative return signal 208. In some examples, the radar device may output an object detection in association with true positive return signal 206 and, because the false negative return signal 208 was not identified, the radar device would erroneously fail to output an object detection associated with false negative return signal 208.

Example Process

Figure 3:
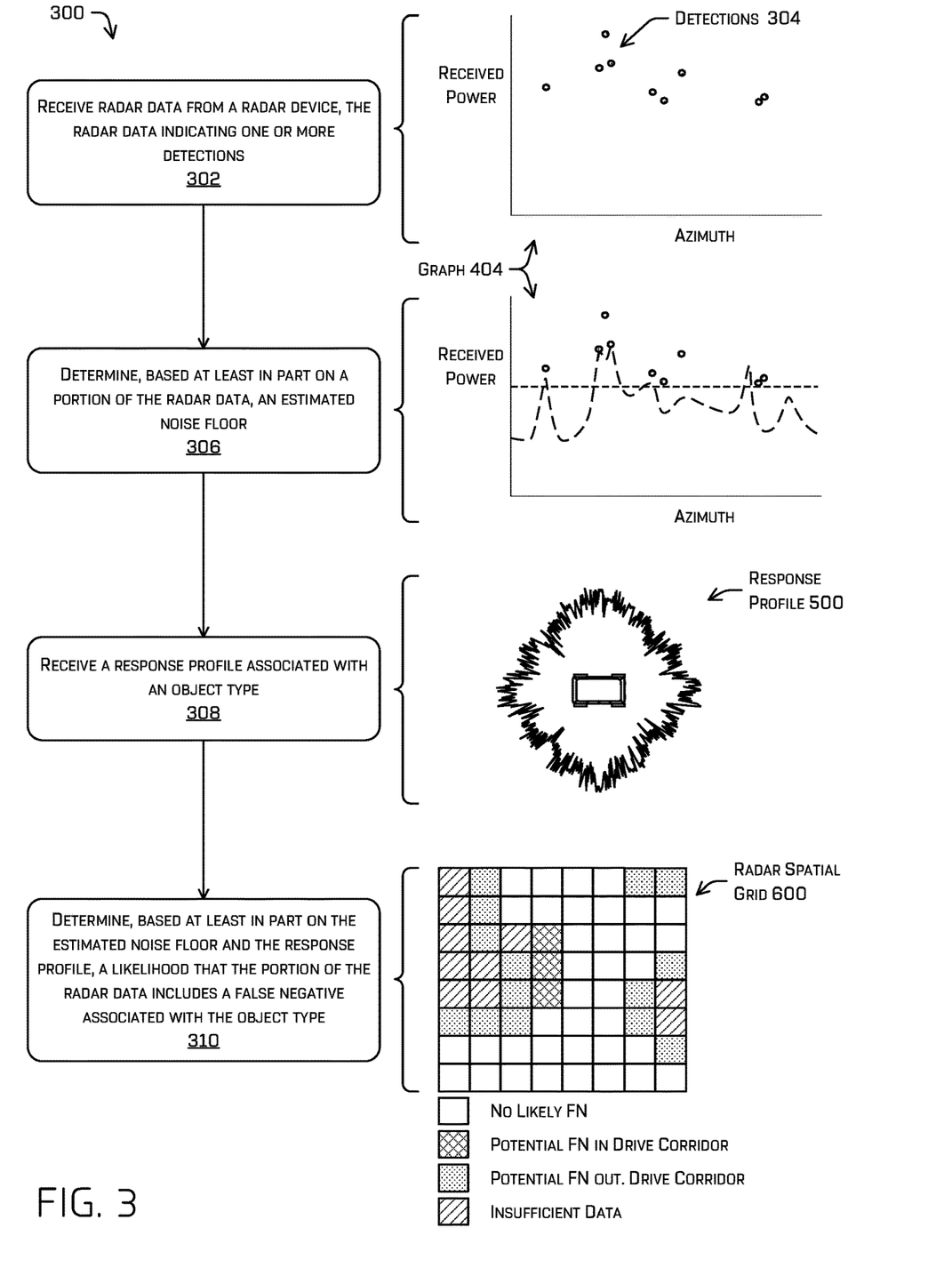
FIG. 3 illustrates a flow diagram of an example process for determining a likelihood that radar data for a particular location within an environment may include a false negative.

FIG. 3 illustrates an example process 300 for determining a likelihood of whether at least a portion of radar data comprises a false negative. For example, the portion may be associated with a cell and/or bin of the radar data.

At operation 302, example process 300 may comprise receiving radar data from a radar device, the radar data indicating one or more detections, according to any of the techniques discussed herein. In some examples, an object detection may comprise an indication of at least a distance, azimuth, and/or received power associated with a return signal identified by the radar device, although an object detection may additionally or alternatively indicate a doppler, elevation, SNR, and/or RCS associated with a detected object. For the sake of clarity, the discussion herein primarily regards distance, azimuth, and received power, although it is understood that the techniques discussed herein may be based on less or more data. FIG. 3 includes a depiction of detections 304 (which may represent detections 400 and detection 402) having various received powers and azimuths at a same or similar distance (e.g., since the detections 304 are represented two-dimensionally). However, it is understood that example process 300 may be applied to two-or-more dimensional radar data. For example, the noise floor estimation and/or other operations discussed herein may be conducted by collapsing the object detection into less dimensions (e.g., by conducting the operations on the radar data at a set distance, a set azimuth, and so on), and/or based on up to all the dimensions of the object detection.

In some examples, operation 302 may additionally or alternatively determine a subset of detection(s) that are associated with a cell and/or bin. For example, operation 302 may comprise determining that the one or more detections are within a first range of distances and/or a second range of azimuths (i.e., the subset fall within a bin/cell). This subset is accordingly associated with a same region of an environment (which may be represented by a cell).

At operation 306, example process 300 may comprise determining, based at least in part on a portion of the radar data, an estimated noise floor, according to any of the techniques discussed herein. Operation 306 may comprise determining an approximate value of the noise floor associated with the raw signal generated by the radar sensor based upon which the radar device determined a detection threshold and, resultantly, the one or more detections. In some instances, determining the estimated noise floor may be based at least in part on a noise factor, which may be determined based at least in part on a received power, SNR, average raw signal power, and/or the like (which may be received from the radar device in some cases). In some examples, the estimated noise floor may comprise an estimate of an average and/or distribution of the noise received at the radar sensor. For example, operation 306 may comprise fitting a constant function, a statistical distribution, and/or a polynomial function to the one or more detections indicated by the radar data.

FIG. 4 illustrates an example of a constant estimated noise floor 406 and a variable estimated noise floor 408 (reproduced in FIG. 3 without labeling for the sake of space). The constant estimated noise floor 406 may represent the result of determining an estimated noise floor based at least in part on fitting a constant function to the one or more detections. Such a determination may comprise determining a constant that is close to, but less than a value of a detection associated with a lowest received power.

Additionally or alternatively, determining the variable estimated noise floor 408 may comprise modeling a CFAR algorithm and/or fitting a distribution (e.g., a Gaussian distribution), mixture model, Fourier series, and/or polynomial function to the one or more detections, such that the one or more detections are associated with received powers that are greater than the variable estimated noise floor 408.

Figure 5A:
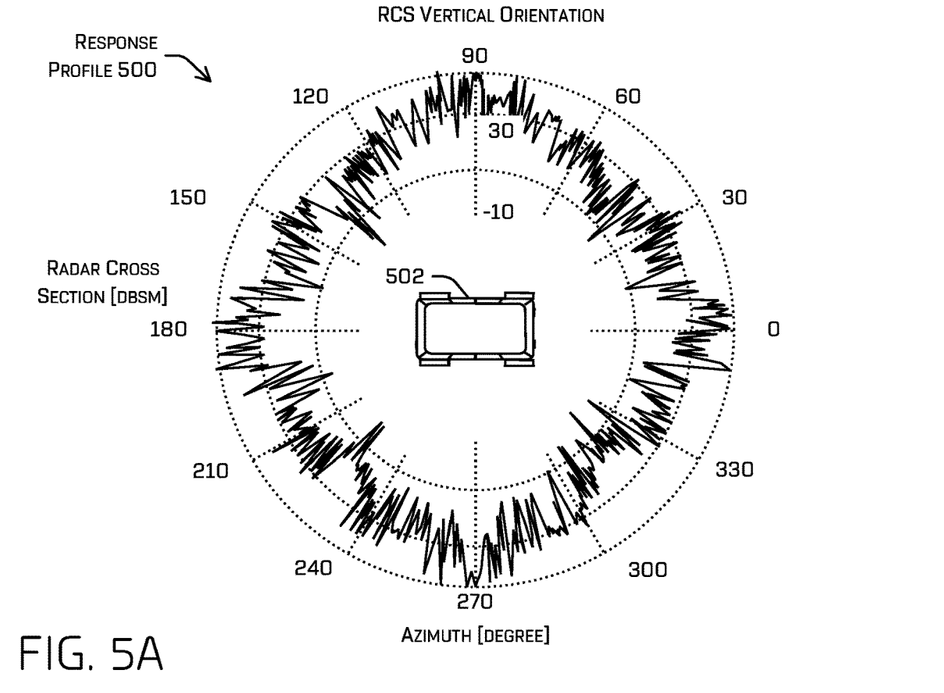
FIG. 5A illustrates a rotary graph of an example response profile for a vehicle.

At operation 308, example process 300 may comprise receiving a response profile associated with an object type, according to any of the techniques discussed herein. In some examples, operation 308 may comprise additionally or alternatively determining a response profile by receiving a label (e.g., "pedestrian," "cyclist") associated with the object type and associating the label with sensor data. For example, a sensor may capture a power and/or RCS responsive to transmitting radio waves toward the object and/or while varying an azimuth, distance, elevation, and/or the like to generate a profile of a manner in which the object responds to radio waves. In other words, a response profile 500 may parameterize characteristic(s) of an object type that affect how the object type reflects radio waves and, accordingly, characteristic(s) of a signal generated by a radar sensor responsive to receiving such reflections. In some examples, operation 308 may comprise receiving and/or determining a minimum value, maximum value, mean, and/or standard deviation associated with the response profile. Operation 308 may additionally or alternatively comprise determining a value of the response profile to use herein based at least in part on a minimum value, maximum value, mean, and/or standard deviation associated with the response profile. In at least some examples, the response profile and/or a value thereof that is used herein may be determined based at least in part on a distance to the object.

The size, material, orientation, and/or the like of an object may be at least some of the characteristics that affect radio wave reflection. In examples where an object type may have variation between characteristics multiple response profiles may be generated therefor. For example, vehicles may differ greatly in size, therefore multiple response profiles may be generated for different types of vehicles.

Figure 5B:
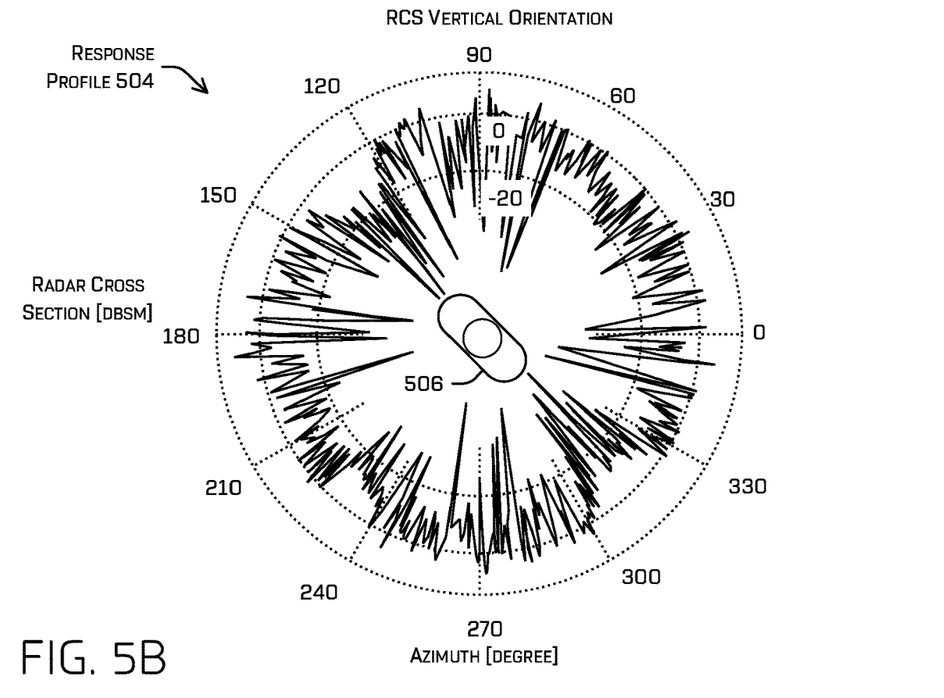
FIG. 5B illustrates a rotary graph of an example response profile for a pedestrian.

FIG. 5A depicts a rotary graph of an example of a response profile 500 of a particular object type, e.g., a passenger vehicle 502. FIG. 5B depicts a rotary graph of an example of a response profile 504 of a particular object type, e.g., a pedestrian 506. In particular, FIGS. 5A and 5B depicts a radial graph of an RCS of the passenger vehicle 502, measured in decibel-meters$^2$ (dBsm) at varying azimuths. The response profile 500 and/or response profile 504 may additionally or alternatively include a received power (e.g., at a radar sensor) and/or additional or alternate dimensions (e.g., an altitude/pitch relative to the sensor). Moreover, a response profile may be generated and stored for a plurality of object types (e.g., pedestrian, large pedestrian, small pedestrian, cyclist, multi-operator cyclist, vehicle, large vehicle, oversized vehicle, small vehicle, traffic signage, animal, and so on).

Regardless, at operation 306, example process 300 may retrieve a response profile. In some examples, example process 300 may be executed for each response profile (and accordingly, each object type). In an additional or alternate example, example process 300 may be executed based at least in part on perception data received from a perception engine such as, for example, a classification, an instance segmentation, a region of interest, and/or the like associated with sensor data such as, for example, an image, lidar data, etc. In such an example, operation 308 may comprise retrieving a response profile associated with at least a portion of the perception data.

At operation 310, example process 300 may comprise determining, based at least in part on the estimated noise floor and the response profile, a likelihood that the portion of the radar data includes a false negative associated with the object type, according to any of the techniques discussed herein. In some examples, operation 310 may comprise calculating a likelihood function (e.g., a Bayesian likelihood) based at least in part on a probability, the estimated noise floor, and/or the response profile. For example, calculating the likelihood may comprise determining a likelihood (e.g., conditional probability) that a false negative exists in the portion of the radar data (FN=true) given the estimated noise floor, $\eta$, and the response profile for an i-th object type, $h_i$. In other words, the estimated noise floor and response profile may be considered "observed data" or "events" and the probability may be considered a parameter, according to the Bayesian meaning thereof. In some examples, the likelihood, L, may be defined as:

$$L = P(FN = \text{true}|\eta, h_i) = \frac{P(\eta, h_i|FN = \text{true})_{P(FN=true)}}{P(\eta, h_i)} \quad (1)$$

As discussed above, the estimated noise floor, $\eta$, may be a function of distance, azimuth, elevation, and/or the like. In some examples, where the estimated noise floor is a function of multiple dimensions, the estimated noise floor may be evaluated at values corresponding to a range, azimuth, elevation, and/or the like corresponding to the portion of radar data (e.g., by evaluating the estimated noise floor function at values associated with a bin/cell). In additional or alternate examples, the estimated noise floor may be evaluated at a set distance, elevation, and/or the like, therefore such evaluation may not occur at operation 310.

In an additional or alternate example, the likelihood may be determined based at least in part on a a probability that a false negative exists in the portion of the radar data. In some examples, such a probability may be a parameter that is set and stored in memory and/or it may be a parameter that is varied based at least in part on a confidence level associated with perception data received from the perception engine. Put simply, the likelihood may be a conditional probability that there was a prior probability, p, of the portion of radar data including a false negative given the estimated noise floor and the response profile (and/or a value of the response profile). The probability may be set to be any value between 0 and 1, in some examples, although, in some instances, the probability may be at least 0.5.

For example, the probability that a portion of the radar data comprises a false negative, p(FN), may be represented as follows:

$$p(FN) = \int_{-\infty}^{\eta} p(x|h_i)dx \quad (2)$$

In some examples, the likelihood function may be additionally or alternatively represented as follows, according to equation 2:

$$L = P(p(FN)|\eta, h_i) = \frac{p(\eta, h_i|p(FN))_{p(FN)}}{P(\eta, h_i)} \quad (3)$$

Figure 6:
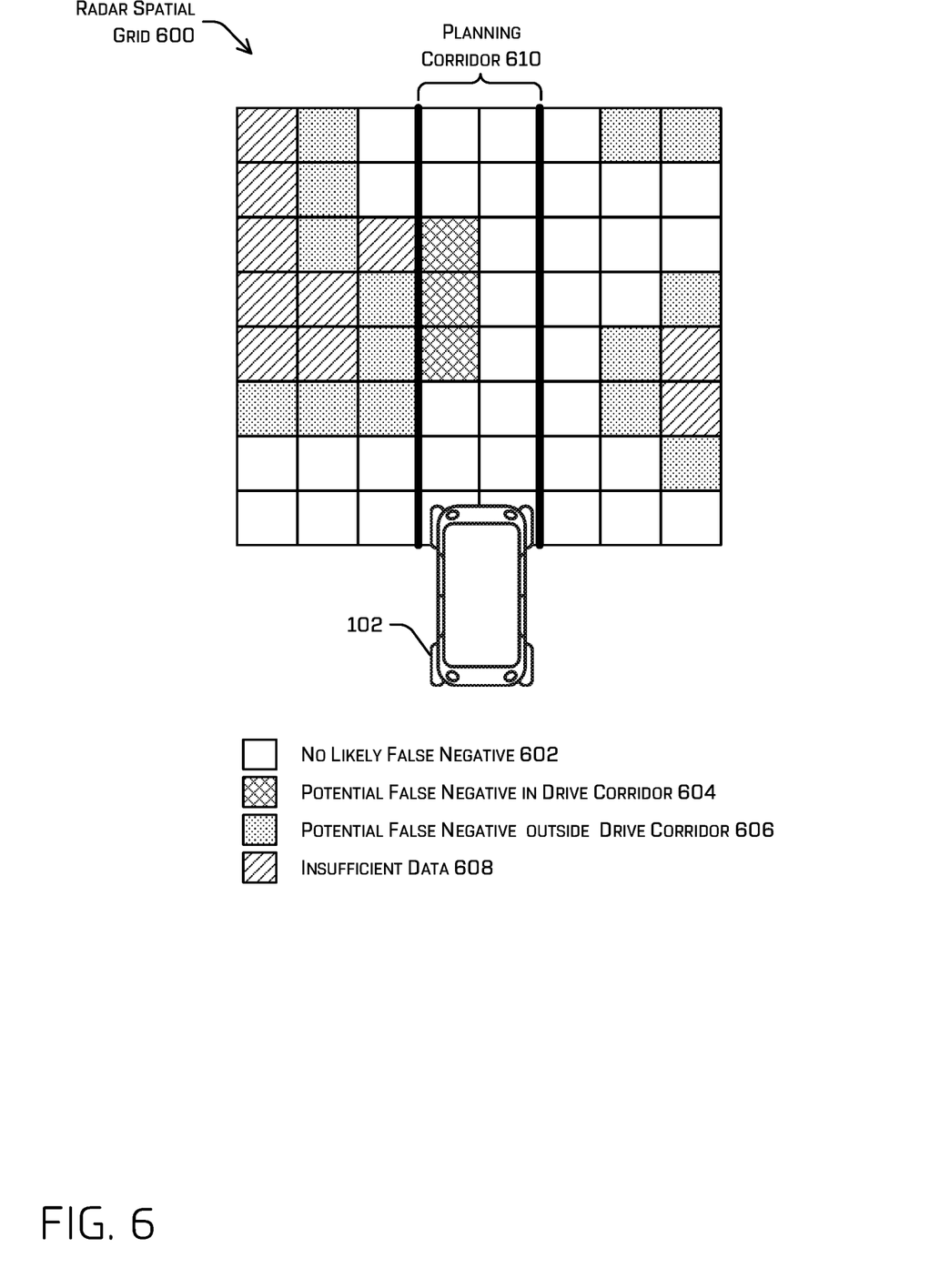
FIG. 6 illustrates an example radar spatial grid having false negative likelihoods associated therewith.

In some examples, operation 310 may additionally or alternatively comprise populating a radar spatial grid 600 with likelihoods. In some examples, a cell of the radar spatial grid 600 may be associated with a likelihood that a portion of radar data associated therewith includes a false negative in detecting an object type. Operation 310 may additionally or alternatively determine whether to indicate that a false negative is likely (e.g., the likelihood meets or exceeds a likelihood threshold) and/or to determine whether a portion of the radar data that may contain a false negative is within a planning corridor associated with operating an autonomous vehicle.

Note that, although the example process 300 is depicted as sequential operations, it is understood that the operations discussed herein may be performed in a different order, simultaneously, and/or by one or more devices.

Example Radar Spatial Grid

FIG. 6 illustrates an example of a radar spatial grid 600 comprising a plurality of cells, wherein a likelihood associated with an object type may be associated with one or more of cells of the plurality of cells. In some examples, the radar spatial grid 600 may additionally or alternatively comprise an indication of whether the likelihood meets or exceeds a threshold likelihood. For example, FIG. 6 depicts portions of the environment (represented as cells) associated with a likelihood that does not meet or exceed the likelihood threshold as shaded according to a "no likely false negative" indication 602 and portions associated with a likelihood that meets or exceeds a likelihood threshold as shaded according to a "potential false negative" indication (602 and/or 604). Portions for which not enough radar data was available to determine a likelihood are shaded according to the "insufficient data" indication 608 (e.g., the portion(s) may be occluded by a surface of an object).

In some examples, the techniques discussed herein may additionally or alternatively comprise determining cells associated with a planning corridor 610. In some examples, the planning corridor 610 may be determined by a planner of autonomous vehicle 102 based at least in part on a width of the autonomous vehicle and/or perception data received from the perception engine. In some examples, the planning corridor 610 may bound potential trajectories generated by the perception engine and/or the planner may select a trajectory for operating the autonomous vehicle 102 from among the potential trajectories based at least in part on determining that no portion of the trajectory lies outside the planning corridor 610. In some instances, the planning corridor 610 may indicate at least a portion of a drivable surface that is free of other objects. The planning corridor 610 may additionally or alternatively be based at least in part on a width of the vehicle and/or tolerances associated with operating the autonomous vehicle 102.

In some examples, the perception engine may generate predictions based at least in part on at least part of the data identified by the radar spatial grid 600 and/or the planner may generate trajectories based at least in part on at least a cell that has a potential false negative and lies within the planning corridor.

Example System

Figure 7:
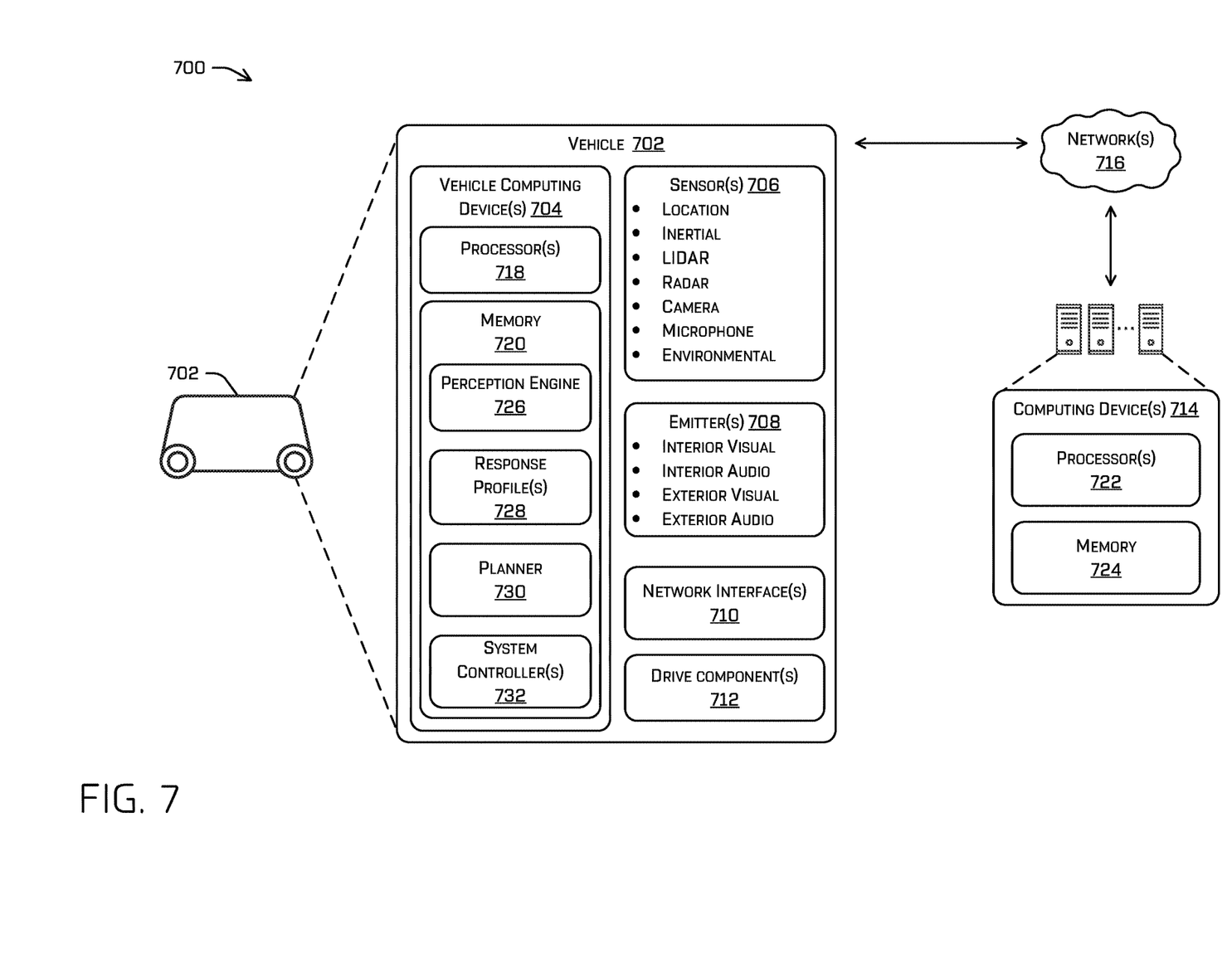
FIG. 7 illustrates a block diagram of an example system for controlling an autonomous vehicle based at least in part on determining a likelihood that radar data comprises a false negative.

FIG. 7 illustrates a block diagram of an example system that implements the techniques discussed herein. In some instances, the system 700 may include a vehicle 702, which may represent the autonomous vehicle 102 in FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include a vehicle computing device(s) 704, sensor(s) 706, emitter(s) 708, network interface(s) 710, and/or drive component(s) 712.

In some instances, the sensor(s) 706 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 714.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive component(s) 712. Also, the network interface (s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 714. In some examples, computing device(s) 714 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 716. For example, the network interface(s) 710 may enable Wi-Fi-based communication such as via frequencies defined by the IEEE 700.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 704 and/or the sensor(s) 706 may send sensor data, via the network(s) 716, to the computing device(s) 714 at a particular frequency, after a lapse of a predetermined period of time, in near real-time, etc.

In some instances, the vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 718 and memory 720 communicatively coupled with the one or more processors 718. Computing device(s) 714 may also include processor(s) 722, and/or memory 724. The processor(s) 718 and/or 722 may be any suitable processor capable of executing instructions to process data and perform operations as described herein. By way of example and not limitation, the processor(s) 718 and/or 722 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 720 and/or 724 may be examples of non-transitory computer-readable media. The memory 720 and/or 724 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 720 and/or memory 724 may store a perception engine 726, response profile(s) 728, a planner 730, and/or system controller(s) 732. Perception engine 726 may represent perception engine 110, response profile (s) may include and/or represent response profile 500, and/or planner 730 may represent planner 112. In some instances, perception engine 726 may comprise a primary perception system, a secondary perception system, a prediction system, and/or a localization system. The memory 720 and/or 724 may additionally or alternatively store a mapping system, a planning system, a ride management system, etc. Although perception engine 726 and/or planner 730 are illustrated as being stored in memory 720 (and/or 724), perception engine 726 and/or planner 730 may include processor-executable instructions, machine-learned model(s) (e.g., a neural network), and/or hardware.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 720 may additionally or alternatively store one or more system controller(s) 732, which may be configured to control steering, propulsion, braking, safety, emitters, communication, and other systems of the vehicle 702. These system controller(s) 732 may communicate with and/or control corresponding systems of the drive component(s) 712 and/or other components of the vehicle 702. For example, the planner 730 may generate instructions based at least in part on perception data generated by the perception engine 726 (which may comprise any of the radar spatial grids and/or likelihoods discussed herein) and transmit the instructions to the system controller(s) 732, which may control operation of the vehicle 702 based at least in part on the instructions. In some examples, if the planner 730 receives a notification that a track of an object was "lost" (e.g., an object no longer appears in sensor data that does appear in LIDAR and isn't occluded by any other objects), the planner 730 may generate an instruction to bring the vehicle 702 to a safe stop and/or to transmit a request for teleoperator assistance.

In some examples, the computing device(s) 714 may generate and/or store response profile(s) 728. For example, computing device(s) 714 may comprise sensors necessary for generating response profile(s) 728. For example, the sensors may comprise one or more radio wave emitters and one or more radio wave sensors associated therewith. In some examples, the computing device(s) 714 may generate a response profile for an object type based at least in part on sensor data and/or perception data received from one or more vehicles over network(s) 716 (e.g., the sensor data may comprise historical sensor data and/or radar data, the perception data may label the sensor data including a label associated with an object type and/or identify an estimated orientation, size, material, and/or other characteristic associated with an object).

It should be noted that while FIG. 7 is illustrated as a distributed system, in alternative examples, components of the vehicle 702 may be associated with the computing device(s) 714 and/or components of the computing device(s) 714 may be associated with the vehicle 702. That is, the vehicle 702 may perform one or more of the functions associated with the computing device(s) 714, and vice versa.

Example Clauses

A. A method comprising: receiving radar data from a radar device, the radar data indicating one or more detections associated with an environment; determining, based at least in part on at least a portion of the radar data, an estimated noise floor, wherein the portion is associated with a region of the environment; receiving a response profile associated with an object type, wherein the response profile identifies at least one of a received signal power or radar cross section associated with the object type; and determining, based at least in part on the estimated noise floor and the response profile, a likelihood that the portion of the radar data includes a false negative associated with the object type.

B. The method of paragraph A, wherein determining the likelihood is based at least in part on a Bayesian likelihood function wherein the response profile and the estimated noise floor are random variables associated with the Bayesian likelihood function.

C. The method of either paragraph A or B, further comprising: generating a radar spatial grid comprising one or more cells, wherein a cell of the one or more cells is associated with the portion and the region of the environment; and associating the likelihood with a first cell of the one or more cells;

D. The method of any one of paragraphs A-C, further comprising: receiving a planning corridor associated with operating an autonomous vehicle; determining a set of cells of the one or more cells that are within the planning corridor, wherein the set of cells comprises the first cell; generating a trajectory for controlling the autonomous vehicle based at least in part on the likelihood associated with the first cell.

E. The method of any one of paragraphs A-D, further comprising: receiving a second response profile associated with a second object type; and determining, based at least in part on the estimated noise floor and the second response profile, a second likelihood that the portion of the radar data includes a second false negative associated with the second object type.

F. The method of any one of paragraphs A-E, wherein the likelihood is based at least in part on one or more of a reflected power or a radar cross section measurement.

G. A system comprising: one or more sensors; one or more processors; and a memory storing processor-executable instructions that, when executed by the one or more processors, cause the system to perform operations comprising: receiving radar data from a radar device, the radar data indicating one or more detections associated with an environment; determining, based at least in part on at least a portion of the radar data, an estimated noise floor, wherein the portion is associated with a region of the environment; receiving a response profile associated with an object type, wherein the response profile identifies at least one of a received signal power or radar cross section associated with the object type; and determining, based at least in part on the estimated noise floor and the response profile, a likelihood that the portion of the radar data includes a false negative associated with the object type.

H. The system of paragraph G, wherein determining the likelihood is based at least in part on a Bayesian likelihood function wherein the response profile and the estimated noise floor are random variables associated with the Bayesian likelihood function.

I. The system of either paragraph G or H, wherein the operations further comprise: generating a radar spatial grid comprising one or more cells, wherein a cell of the one or more cells is associated with the portion and the region of the environment; and associating the likelihood with a first cell of the one or more cells.

J. The system of any one of paragraphs G-I, wherein the operations further comprise: receiving a planning corridor associated with operating an autonomous vehicle; determining a set of cells of a radar spatial grid that are within the planning corridor, wherein the set of cells comprises a first cell associated with the likelihood; and generating a trajectory for controlling the autonomous vehicle based at least in part on the likelihood.

K. The system of any one of paragraphs G-J, wherein the operations further comprise: receiving a second response profile associated with a second object type; and determining, based at least in part on the estimated noise floor and the second response profile, a second likelihood that the portion of the radar data includes a second false negative associated with the second object type.

L. The system of any one of paragraphs G-K, wherein the operations further comprise generating a trajectory for controlling the autonomous vehicle based at least in part on the likelihood.

M. The system of any one of paragraphs G-L, wherein the one or more sensors comprise at least one radar device.

N. The system of any one of paragraphs G-M, wherein determining the estimated noise floor is based at least in part on at least one of: a second object type associated with a detected object; a size of the detected object; a magnitude of a return signal indicated by the radar data and associated with the detected object; other sensor data; a region of interest associated with an image; a statistical distribution; or fitting at least one of the statistical distribution, a mixture model, a polynomial, or a Fourier series to the portion of the radar data.

O. The system of any one of paragraphs G-N, wherein the likelihood is based at least in part on one or more of a reflected power or a radar cross section measurement.

P. A non-transitory computer-readable medium storing processor-executable instructions that, when executed by one or more processors, cause the one or more processors to perform operations comprising: receiving radar data from a radar device, the radar data indicating one or more detections associated with an environment; determining, based at least in part on at least a portion of the radar data, an estimated noise floor, wherein the portion is associated with a region of the environment; receiving a response profile associated with an object type, wherein the response profile identifies at least one of a received signal power or radar cross section associated with the object type; and determining, based at least in part on the estimated noise floor and the response profile, a likelihood that the portion of the radar data includes a false negative associated with the object type.

Q. The non-transitory computer-readable medium of paragraph P, wherein the operations further comprise: generating a radar spatial grid comprising one or more cells, wherein a cell of the one or more cells is associated with the portion and the region of the environment; and associating the likelihood with a first cell of the one or more cells;

R. The non-transitory computer-readable medium of either paragraph P or Q, wherein the operations further comprise: receiving a second response profile associated with a second object type; and determining, based at least in part on the estimated noise floor and the second response profile, a second likelihood that the portion of the radar data includes a second false negative associated with the second object type.

S. The non-transitory computer-readable medium of any one of paragraphs P-R, the likelihood is based at least in part on one or more of a reflected power or a radar cross section measurement.

T. The non-transitory computer-readable medium of any one of paragraphs P-S, wherein determining the estimated noise floor is based at least in part on at least one of: a second object type associated with a detected object; a size of the detected object; a magnitude of a return signal indicated by the radar data and associated with the detected object; other sensor data; a region of interest associated with an image; a statistical distribution; or fitting at least one of the statistical distribution, a mixture model, a polynomial, or a Fourier series to the portion of the radar data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving radar data from a radar device, the radar data indicating one or more detections associated with an environment;
determining, based at least in part on at least a portion of the radar data, an estimated noise floor, wherein the portion is associated with a region of the environment;
receiving a response profile associated with an object type, wherein the response profile identifies at least one of a received signal power or radar cross section associated with the object type;
determining, based at least in part on the estimated noise floor and the response profile, a likelihood that the portion of the radar data includes a false negative associated with the object type; and
controlling a vehicle based at least in part on the likelihood.

2. The method of claim 1, wherein determining the likelihood is based at least in part on a Bayesian likelihood function wherein the response profile and the estimated noise floor are random variables associated with the Bayesian likelihood function.

3. The method of claim 1, further comprising:
generating a radar spatial grid comprising one or more cells, wherein a cell of the one or more cells is associated with the portion and the region of the environment; and
associating the likelihood with a first cell of the one or more cells.

4. The method of claim 3, further comprising:
receiving a planning corridor associated with operating the vehicle;
determining a set of cells of the one or more cells that are within the planning corridor, wherein the set of cells comprises the first cell; and
generating a trajectory for controlling the vehicle based at least in part on the likelihood associated with the first cell.

5. The method of claim 1, further comprising:
receiving a second response profile associated with a second object type; and
determining, based at least in part on the estimated noise floor and the second response profile, a second likelihood that the portion of the radar data includes a second false negative associated with the second object type.

6. The method of claim 1, wherein the likelihood is based at least in part on one or more of a reflected power or a radar cross section measurement.

7. A system comprising:
one or more processors; and
a memory storing processor-executable instructions that, when executed by the one or more processors, cause the system to perform operations comprising:
receiving radar data from a radar device, the radar data indicating one or more detections associated with an environment;
determining, based at least in part on at least a portion of the radar data, an estimated noise floor, wherein the portion is associated with a region of the environment;
receiving a response profile associated with an object type, wherein the response profile identifies at least one of a received signal power or radar cross section associated with the object type;
determining, based at least in part on the estimated noise floor and the response profile, a likelihood that the portion of the radar data includes a false negative associated with the object type; and
controlling a vehicle based at least in part on the likelihood.

8. The system of claim 7, wherein determining the likelihood is based at least in part on a Bayesian likelihood function wherein the response profile and the estimated noise floor are random variables associated with the Bayesian likelihood function.

9. The system of claim 7, wherein the operations further comprise:
generating a radar spatial grid comprising one or more cells, wherein a cell of the one or more cells is associated with the portion and the region of the environment; and
associating the likelihood with a first cell of the one or more cells.

10. The system of claim 7, wherein the operations further comprise:
receiving a planning corridor associated with operating the vehicle;
determining a set of cells of a radar spatial grid that are within the planning corridor, wherein the set of cells comprises a first cell associated with the likelihood; and
generating a trajectory for controlling the vehicle based at least in part on the likelihood.

11. The system of claim 7, wherein the operations further comprise:
receiving a second response profile associated with a second object type; and
determining, based at least in part on the estimated noise floor and the second response profile, a second likelihood that the portion of the radar data includes a second false negative associated with the second object type.

12. The system of claim 7, wherein the operations further comprise generating a trajectory for controlling an autonomous vehicle based at least in part on the likelihood.

13. The system of claim 7, wherein determining the estimated noise floor is based at least in part on at least one of:
a second object type associated with a detected object;
a size of the detected object;
a magnitude of a return signal indicated by the radar data and associated with the detected object;
additional sensor data received from at least one of a location sensor, inertia sensor, magnetic field sensor, depth position sensor, image sensor, audio sensor, or environmental sensor;
a region of interest associated with an image;
a statistical distribution; or
fitting at least one of the statistical distribution, a mixture model, a polynomial, or a Fourier series to the portion of the radar data.

14. The system of claim 7, wherein the likelihood is based at least in part on one or more of a reflected power or a radar cross section measurement.

15. The system of claim 7 further comprising one or more sensors, wherein the one or more sensors comprise at least one radar device.

16. A non-transitory computer-readable medium storing processor-executable instructions that, when executed by one or more processors, cause the one or more processors to perform operations comprising:
receiving radar data from a radar device, the radar data indicating one or more detections associated with an environment;

determining, based at least in part on at least a portion of the radar data, an estimated noise floor, wherein the portion is associated with a region of the environment;

receiving a response profile associated with an object type, wherein the response profile identifies at least one of a received signal power or radar cross section associated with the object type;

determining, based at least in part on the estimated noise floor and the response profile, a likelihood that the portion of the radar data includes a false negative associated with the object type; and controlling a vehicle based at least in part on the likelihood.

17. The non-transitory computer-readable medium of claim 16, wherein the operations further comprise:

generating a radar spatial grid comprising one or more cells, wherein a cell of the one or more cells is associated with the portion and the region of the environment; and associating the likelihood with a first cell of the one or more cells.

18. The non-transitory computer-readable medium of claim 16, wherein the operations further comprise:

receiving a second response profile associated with a second object type; and determining, based at least in part on the estimated noise floor and the second response profile, a second likelihood that the portion of the radar data includes a second false negative associated with the second object type.

19. The non-transitory computer-readable medium of claim 16, the likelihood is based at least in part on one or more of a reflected power or a radar cross section measurement.

20. The non-transitory computer-readable medium of claim 16, wherein determining the estimated noise floor is based at least in part on at least one of:

a second object type associated with a detected object;

a size of the detected object;

a magnitude of a return signal indicated by the radar data and associated with the detected object;

additional sensor data received from at least one of a location sensor, inertia sensor, magnetic field sensor, depth position sensor, image sensor, audio sensor, or environmental sensor;

a region of interest associated with an image;

a statistical distribution; or fitting at least one of the statistical distribution, a mixture model, a polynomial, or a Fourier series to the portion of the radar data.

21. The non-transitory computer-readable medium of claim 16, wherein determining the likelihood is based at least in part on a Bayesian likelihood function wherein the response profile and the estimated noise floor are random variables associated with the Bayesian likelihood function.

* * * * *